United States Patent [19]

Gintert

[11] 4,233,048
[45] Nov. 11, 1980

[54] REMOVING FRAGMENTS OF FRACTURED GLASS SHEETS DURING TEMPERING

[75] Inventor: Dean W. Gintert, Pittsburgh, Pa.

[73] Assignee: PPG Industries, Inc., Pittsburgh, Pa.

[21] Appl. No.: 55,203

[22] Filed: Jul. 5, 1979

[51] Int. Cl.³ .............................................. C03B 27/04
[52] U.S. Cl. ........................................ 65/27; 65/114; 65/165; 65/348
[58] Field of Search ................ 65/114, 115, 165, 348, 65/351, 27

[56] References Cited

U.S. PATENT DOCUMENTS

| | | | |
|---|---|---|---|
| 3,223,252 | 12/1965 | Mikus | 214/1 |
| 3,782,916 | 1/1974 | Powell et al. | 65/104 |
| 3,846,106 | 11/1974 | Seymour | 65/114 |
| 4,076,511 | 2/1978 | Fulton et al. | 65/27 |
| 4,138,241 | 2/1979 | McKelvey | 65/351 |

*Primary Examiner*—Arthur D. Kellogg
*Attorney, Agent, or Firm*—Edward I. Mates

[57] ABSTRACT

Removing fragments when a glass sheet breaks during tempering by pivoting a lower nozzle housing of glass sheet tempering apparatus that cools a horizontally oriented glass sheet to an orientation such that glass fragments that are not removed by sliding when the lower nozzle housing pivots to an oblique position can drop by gravity to a fragment collection box without requiring sliding.

9 Claims, 7 Drawing Figures

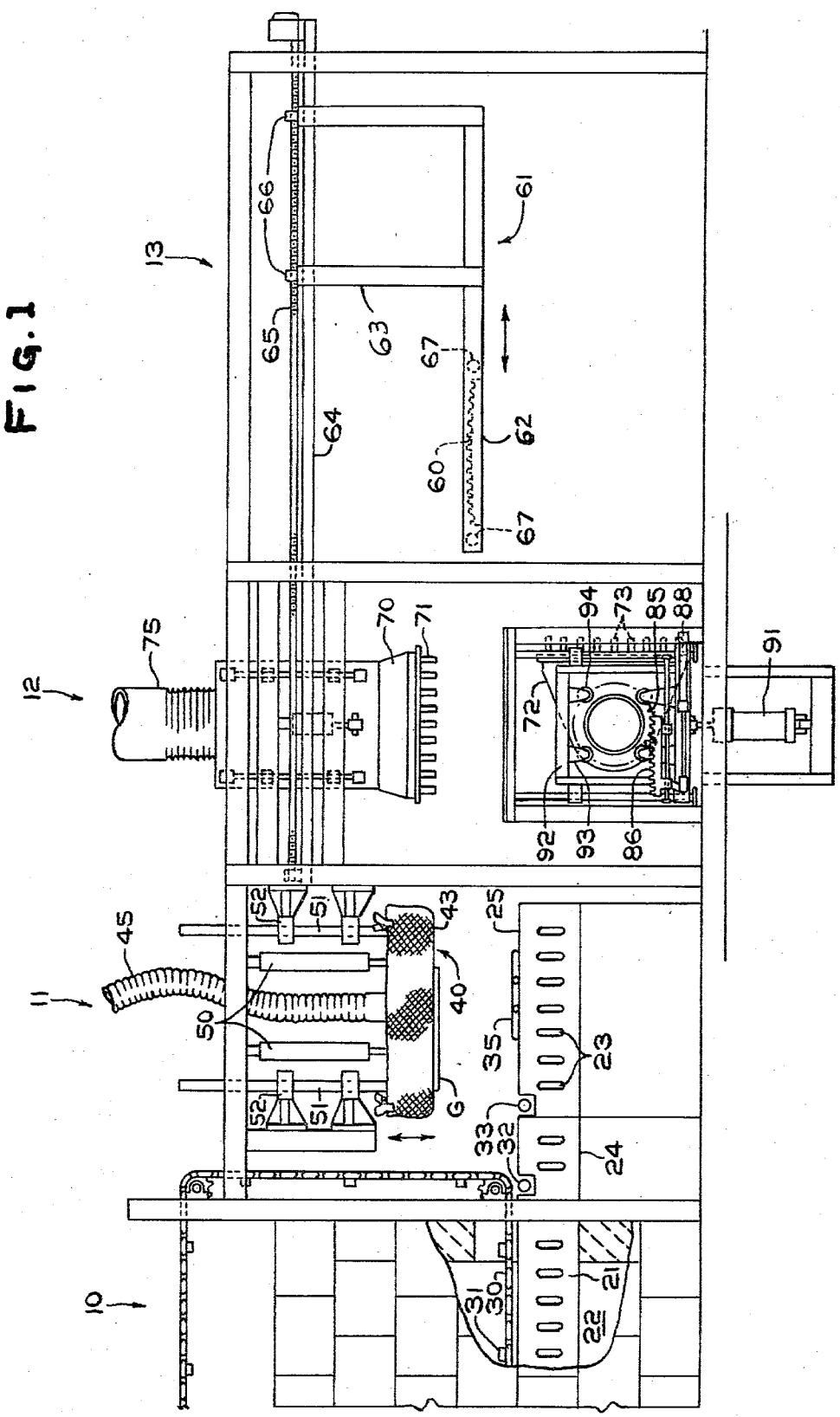

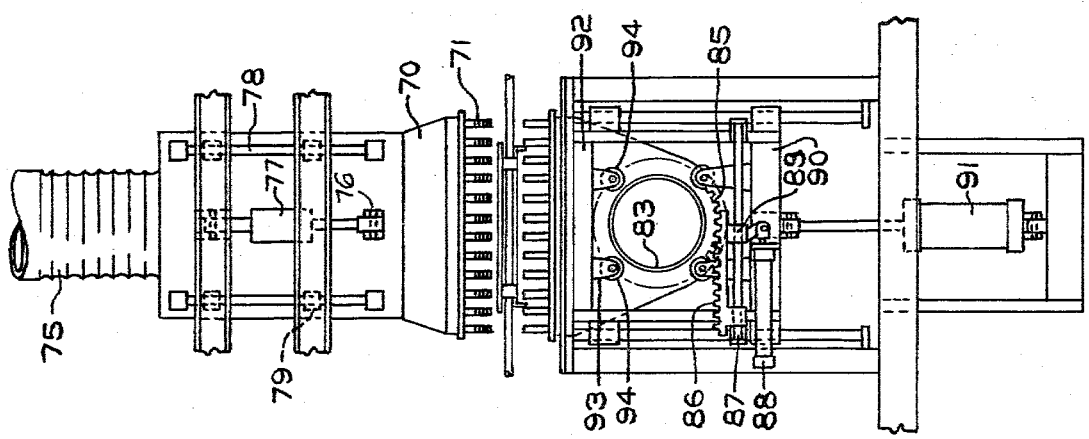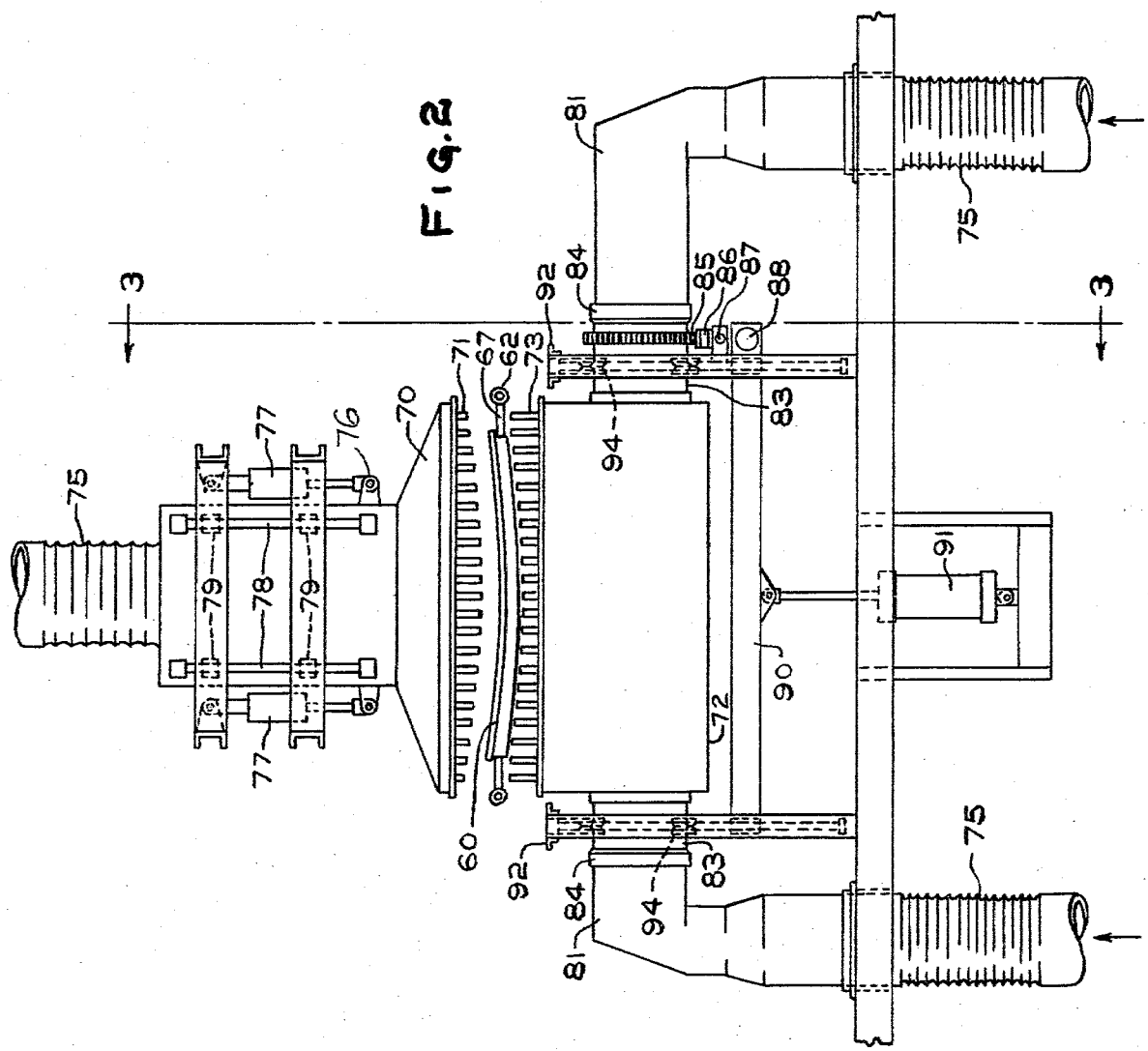

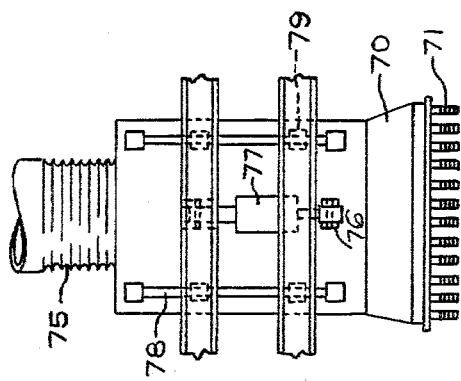
Fig. 5
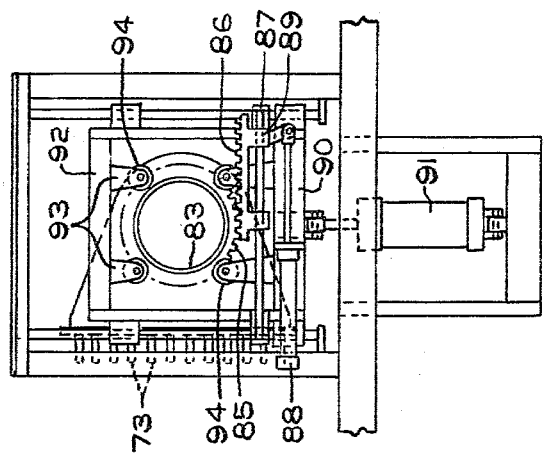
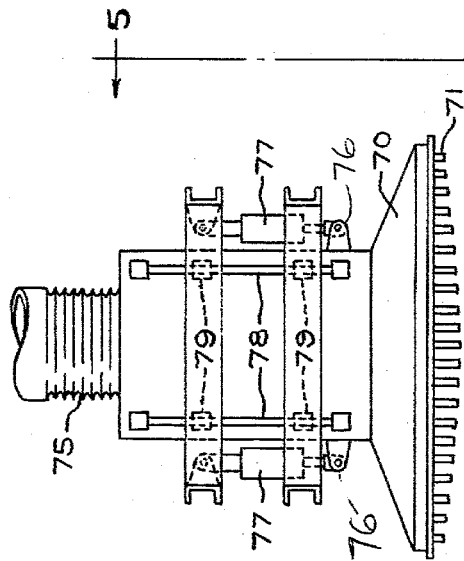
Fig. 4
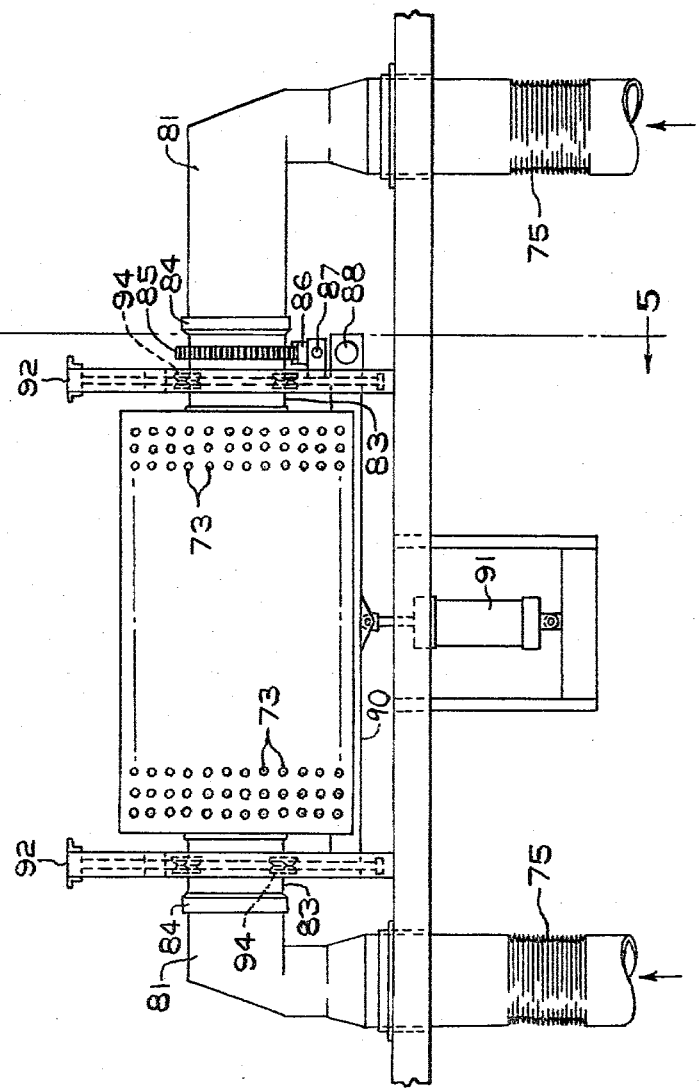

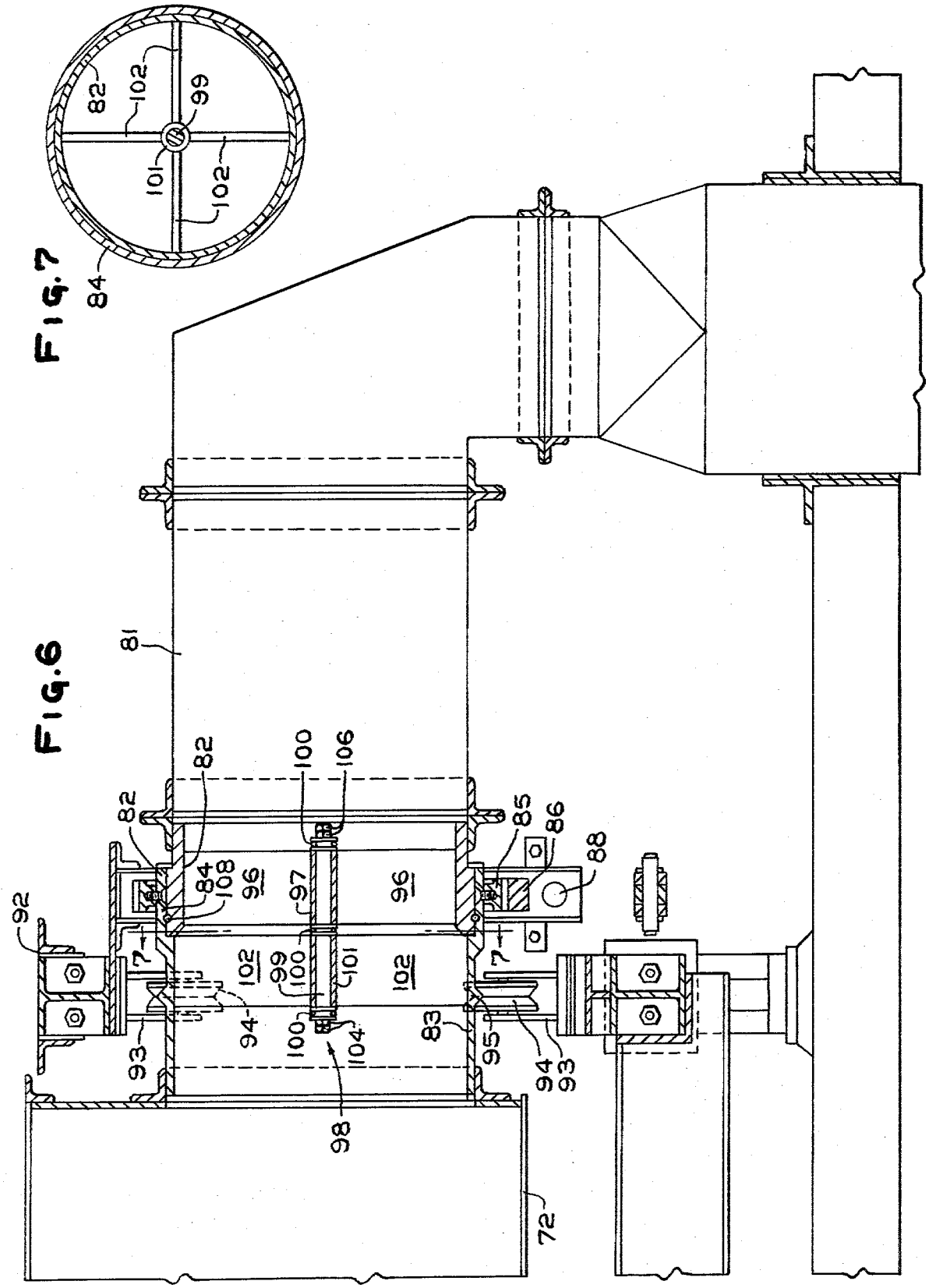

REMOVING FRAGMENTS OF FRACTURED GLASS SHEETS DURING TEMPERING

BACKGROUND OF THE INVENTION

1. Field of the Invention

The present invention relates to the tempering of glass sheets, and is particularly suitable for the fabrication of shaped, tempered glass sheets. While the invention will be described in conjunction with apparatus where glass sheets are tempered after being shaped by a so-called vacuum forming process by which glass sheets in succession are first heated to a deformation temperature, then brought into pressurized engagement against a vacuum mold while heat softened to shape each sheet to its desired shape and then the sheets so shaped are subjected to a rapid cooling from an elevated temperature sufficient to insure the imposition of at least a partial temper or toughening or heat strengthening of the sheet, it will be understood that the present invention may be employed in any environment in which glass sheets are first heated to a temperature above the strain point and approaching the softening point and then are suddenly chilled in order to toughen or to impart at least a partial thermal temper to the glass sheets.

The process of tempering glass sheets imparts to the tempered glass a surface compression stress that completely encloses an interior zone stressed in tension. Since glass is notoriously weak in tension and strong in compression, tempered glass is stronger than untempered glass by virtue of the skin of surface compression stress that surrounds the interior stressed in tension. However, in case the glass sheet being treated has flaws or in case the tension stresses temporarily established during the cooling operation become sufficient to overcome the inherent strength of the glass, the flawed glass may develop a tension stress in its surface of such a nature that during fabrication, and particularly, during the rapid cooling or quenching that follows the heating step, the glass fractures into extremely tiny fragments.

Unless the fragments are removed sufficiently rapidly before the next glass sheet in a series of glass sheets being fabricated under mass production conditions can be removed, the subsequent glass sheets are likely to develop scratches and other problems such as a jam-up, which results when a succeeding glass sheet comes into contact with particles that remain from a previous glass sheet that has been fractured. The succeeding glass sheet may also break if the fragments are not removed in a timely manner or, the next glass sheet in a series may have its surface marred by the particles or fragments of a previous glass sheet that have not been removed from the cooling station.

When glass sheets are supported in a horizontal plane at the cooling station, the space between the upper and lower nozzle boxes is usually so narrow that it is very difficult to remove fragments of fractured glass sheets from the cooling station in time to clear the station for the next successive glass sheet. It has been customary for operators to insert implements, such as wooden sticks, between upper and lower nozzles to force the fragments out of the space between the upper and lower nozzles. Manual manipulation of such implements to remove glass fragments is both expensive and time-consuming, even when fragments of flat glass are to be removed. Furthermore, the inability of implements to remove all of the fragments from the cooling station before the next sheet arrives has caused one or more successive sheets after the fractured sheet to be rejected because the remaining fragments either cause successive glass sheets to fracture or to become scratched so that they did not have the optical properties necessary for customer acceptance. In addition, when glass sheets are shaped prior to their being tempered they are usually transported in a direction parallel to the axis of bending so it becomes extremely difficult for operators with access to the space between upper and lower nozzles only from the sides of the cooling station to insert a tool or implement to remove the glass fragments unless the glass is shaped to a very shallow curvature of substantially uniform radius of curvature and the implements used to remove the glass fragments are shaped accordingly. Such problems of glass fragment removal does not exist when glass sheets are disposed in a vertical plane between opposed sets of nozzles also disposed vertically.

When glass sheets are transported by rotating driving discs that engage one edge of a series of glass sheets supported in an oblique plane, lowering a number of supporting discs along a length equal to a glass sheet length has helped to cause glass fragments to be removed by sliding engagement over a lower bed of tempering nozzles disposed in an oblique orientation. Other devices to improve the speed of removal of glass sheet fragments have involved the pivoting of the lower nozzle housing to an oblique orientation, a simultaneous pivoting upward of the upper nozzle housing simultaneously with reducing the pressure by which the tempering fluid is applied to enable an operator to have more ready access to remove glass fragments with wooden implements. Still another invention involves pivoting the lower nozzle box from a substantially horizontal orientation to an oblique orientation to permit glass fragments to slide downward away from the furnace exit whenever breakage occurs. Still another apparatus in the prior art that conveys glass sheets on a series of conveyor rolls uses means for pivoting both the upper and lower nozzle housings to oblique orientations to provide both additional access space for operators to remove glass fragments with hand operated tools and also to permit glass particles or fragments to slide below a level of support provided by the upper surface of the series of conveyor rolls of a roller hearth along which glass sheets are transported through a cooling station.

While some of the latter improvements provided benefits compared to those obtained merely by using hand implements to remove fragments whenever they occurred, sometimes there still remained some fragments after conclusion of a tempering operation.

2. Description of the Prior Art

U.S. Pat. No. 3,223,252 to Mikus supports and engages the lower end edges of a series of glass sheets supported on an oblique plane of support by a gas bed by rotatable driving discs that engage the lower edge of the glass to propel the sheets forward along the gas bed through both a heating station and a cooling station. Whenever a glass sheet breaks into fragments, a series of consecutive discs occupying a space at least equal to or slightly longer than the length of the supported lower end edge is removed from glass supporting position to allow the fragments to float downward unimpeded by the driving discs to one side of the bed. The series of discs is returned to the driving position in time to engage a succeeding sheet being treated.

U.S. Pat. No. 3,846,106 to Seymour discloses glass sheet quenching apparatus comprising upper and lower nozzle housings with a lower nozzle housing being pivotably supported by lifting and lowering means to enable the lower nozzle housing to pivot between a substantially horizontal orientation closely adjacent the lower surface of a heated glass sheet and a second position wherein the upper surface of the lower nozzle housing occupies an oblique orientation to facilitate removal of glass fragments by sliding when a glass sheet is broken during the delivery of cool tempering medium thereagainst.

U.S. Pat. No. 4,076,511 to Fulton, Edmunds and Shields discloses apparatus for removal of glass fragments from the glass sheet tempering apparatus by damping air flow to the cooling chamber simultaneously with the opening or the pivoting upward of the upper nozzle housing to enable operators to obtain more clear access to remove the glass fragments at the cooling station.

U.S. Pat. No. 4,138,241 to McKelvey discloses apparatus for tempering glass sheets in which glass sheets are supported upon rolls through a cooling station where provision is made to pivot both the upper and lower sets of nozzles in-between adjacent conveyor rolls so as to move the nozzle housings between essentially horizontal orientations and oblique orientations. Fragments slide over the obliquely disposed lower set. The upper set is recessed upward to loosen jammed fragments that are not free to slide.

None of the cited patents provided means for free fall of glass fragments to a position below the cooling station where the fragments can be removed. It is essential in all of the prior art patents that the glass be removed either by sliding by gravity over an obliquely disposed lower nozzle housing or by use of hand tools. It remained for the present invention to provide additional improvement over those available from the prior art patents.

SUMMARY OF THE INVENTION

The present invention provides an improved method and apparatus for removing any glass fragments from a cooling station of glass sheet tempering apparatus. In particular, the present invention is incorporated in apparatus comprising an upper nozzle housing having a lower wall and a lower nozzle housing having an upper wall wherein each wall is provided with a plurality of nozzles for directing tempering medium from their associated nozzle housing against the opposite major surfaces of a glass sheet at such a rapid rate as to induce temporary tension stresses that sometimes cause glass sheet breakage during the rapid cooling.

The improvement provided by the present invention comprises means for pivoting the lower plenum chamber between an operating position wherein the nozzles extend upwardly from the upper wall of the lower nozzle housing toward the lower major surface of the glass sheet supported thereon and a cullet clearing position wherein said upper wall is pivoted to at least a vertical orientation and means for raising the upper nozzle housing from an operative position relatively close to the position occupied by the glass sheet at the cooling station to an upwardly recessed position to provide clearance for pivoting the lower nozzle housing into the cullet clearing position. After cullet fragments have been dropped by gravity and after the lower nozzle housing has pivoted a sufficient amount toward its operating position to provide clearance for lowering the upper nozzle housing toward its operating position, the upper nozzle housing is lowered toward its operating position. If the glass sheet fractures during the cooling step, the upper nozzle housing is lifted to provide clearance for rotating the lower nozzle housing into its cullet clearing position. The cullet clearing position of the present invention is beyond the oblique cullet clearing position of the prior art that requires sliding and enables non-sliding cullet fragments to drop by gravity from the support by the lower nozzle housing and nozzles extending therefrom when the latter pivot to a position wherein the particles do not depend upon a low coefficient of friction to slide off the lower nozzle housing support.

The present invention will be understood more clearly in the light of a description of a preferred embodiment which follows. The description includes a set of drawings wherein like reference numbers refer to like structural elements.

DESCRIPTION OF THE DRAWINGS

FIG. 1 is a fragmentary longitudinal side view of typical apparatus for shaping and tempering glass sheets modified according to the present invention, showing the relation of certain structural elements to one another when glass fragments are removed by gravity only;

FIG. 2 is a transverse end view of the cooling station looking downstream of FIG. 1, with a glass sheet supported between upper and lower nozzles showing the relation of the nozzles and their associated nozzle housings during a cooling operation;

FIG. 3 is a longitudinal sectional view taken along the line 3—3 of FIG. 2;

FIG. 4 is a transverse end view of the cooling station looking upstream of FIG. 1, showing the arrangement of the nozzle housings in the positions they occupy for the removal of glass fragments;

FIG. 5 is a view similar to FIG. 3, taken along the lines 5—5 of FIG. 4;

FIG. 6 is an enlarged detailed view of the structure of a pivotal joint incorporated in a preferred embodiment of this invention; and FIG. 7 is a fragmentary sectional view along the line 7—7 of FIG. 6 further illustrating the construction of said pivotal joint.

DESCRIPTION OF PREFERRED EMBODIMENT

FIG. 1 shows a portion of a glass sheet shaping and tempering line modified according to the present invention. The portion of the apparatus depicted includes a furnace 10 (only the exit end of which is shown), a glass sheet shaping station 11, a cooling station 12 and an unloading station 13. The furnace, the shaping station, and the unloading station form no part of the present invention and the description of a specific embodiment of such apparatus is incorporated for the purpose of illustration only. It is understood that any arrangement for heating and tempering a series of horizontally disposed glass sheets that is well known in the art may be employed in connection with the improved tempering apparatus of the present invention. Accordingly, only a brief description of the specific embodiment of the furnace, the shaping station, and the unloading station will be described.

The furnace 10 is preferably of the gas hearth type wherein sheets of glass are supported on a layer of hot gas as they are heated and conveyed through the furnace. Examples of gas support furnaces for heating glass sheets may be found in U.S. Pat. No. 3,223,501 to Fredley et al and in U.S. Pat. No. 3,332,758 to McMaster et al. However, it is also understood that the glass sheet may be conveyed through a furnace on a roller hearth of the type depicted in U.S. Pat. No. 3,476,540 to Ritter et al. Part of the view of FIG. 1 has been cut away to show that the gas support bed for the furnace is defined by a block 21 through which a large number of vertical holes for applying gas (not shown) extend. Some of these provide the upper surface of the gas hearth bed with hot pressurized gases from a plenum chamber 22. This provides a bed of gas on which the glass sheets float during the conveyance through the furnace 10. Additional vertical passages communicate from the top surface of the gas hearth 21 to cross passages 23 which serve as exhaust passages. An extension block 24 and an additional support block 25 are located beyond the furnace exit and in the shaping station 11, respectively.

In the specific embodiment, the glass sheets that are supported by floatation on the upper surfaces of the gas hearths 21, 24 and 25 are conveyed throughout the length of the furnace by a conveying mechanism comprising a pair of parallel, endless chains 30 that flank the path of the glass sheet movement within the furnace interconnected by a plurality of longitudinally spaced pusher bars 31. A take-out roll 32 is located immediately beyond the exit of the furnace 10 that extends transversely across the width of the conveyor path defined by the upper surface of the gas hearth extension 24. Spaced beyond the take-out roll 32 is an aligning roll 33. The take-out roll 32 and the aligning roll 33 project above the upper surface of the gas hearth beds just enough to make contact with the lower major surfaces of glass sheets passing thereover. Take-out roll 32 and aligning roll 33 are rotated at a speed greater than the speed by which the conveying chains 30 move the pusher bars 31 so as to accelerate the passage of the glass sheets from the furnace and into the shaping station 11.

The extension hearth 24 and the support hearth 25 are constructed in a similar manner to that of the gas hearth 21 located in the furnace. The upper surfaces are aligned with one another so as to provide a substantially continuous upper surface for the hearths, broken up only by the slight projection of the take-out roll 32 and aligning roll 33.

A locator frame 35 rests on the gas hearth 25 at the shaping station 11. The locator frame defines one or more open-ended pockets within which the downstream portion of a glass sheet may be received. Each locator frame is contoured to correspond approximately to the outline of the downstream portion of each glass sheet. In this manner, each glass sheet becomes seated firmly within the pocket with little or no freedom of movement when it is urged into engagement with the locator frame 35. The locator frame 35 is spaced from the aligning roll 33 a precisely determined distance so that the trailing edge of a properly aligned glass sheet is approximately directly over the center of the aligning roll when the leading edge of the glass sheet is received in the pocket formed by the frame 35.

When the glass sheet arrives into the pocket of the aligning frame, it is floating on a layer of hot gases and the aligning roll 33 continues to rotate against the trailing edge portion of the glass sheet so as to urge the glass sheet into a more positive alignment into the pocket of the aligning frame 35. The frictional force between the rotating aligning roll 33 and the glass sheet is minimized and restricted to the trailing edge of the glass sheet only in order to minimize scuffing of the glass. However, this rotating force is sufficient to drive the floating glass sheet into an equilibrium position in alignment with the pocket formed by the locator frame and to retain the glass sheet in such aligned position.

As an alternative to a locator frame 35 for aligning glass sheets properly at the shaping station, a plurality of vertically movable stop members such as depicted in U.S. Pat. No. 3,476,540 to George F. Ritter et al may be used. As a further alternative, a timing mechanism responsive to the establishment of a signal responsive to the interruption of a light beam may be used to operate a timer to move a glass sheet a finite distance from a glass sensing mechanism to the position desired for the glass sheet at the shaping station 11. Such an arrangement is disclosed in U.S. Pat. No. 4,092,141 to Robert G. Frank et al.

In the event glass sheets are conveyed on rotating rollers in a roller hearth type of furnace such as depicted in the latter patent, it is not as critical to precisely align the glass sheets at the shaping station. When glass sheets are conveyed on rotating rolls, they may be aligned upstream of the shaping station using an orientation and alignment apparatus of the type depicted in U.S. Pat. No. 3,701,643 to Robert G. Frank. Aligning glass sheets on roller type conveyors is less critical than on gas conveyors because glass sheets are more prone to drift out of alignment when floating freely on gas support. Roller conveyors provide additional friction that holds the glass in alignment provided at an orientation and alignment station.

In the specific embodiment described, a vacuum platen 40 is located directly over the position occupied by the glass sheet or sheets aligned within the locator frame or frames 35. A vacuum platen 40 is located directly over the locator frame 35. The vacuum platen comprises a hollow chamber having a flat bottom plate through which a large number of perforations extend. A protective cover 43 which is preferably a stretchable knit fiber glass fabric such of the type disclosed in U.S. Pat. No. 3,148,968 to James H. Cypher et al is held in place over the bottom surface of the plate of the vacuum platen by clamps. The protective cover 43 protects the surface of the hot glass sheets from thermal shock likely to occur if the sheets make direct contact with the bottom plate of the vacuum platen. The hollow interior of the vacuum platen communicates with a source of vacuum through a flexible conduit 45. The vacuum platen should have an extent greater than the total area of the largest glass sheet or sheets to be received at one time at the shaping station. For the greatest versatility, the vacuum platen may cover substantially the entire area of the gas hearth block 25. The vacuum platen 40 is supported by hydraulic cylinders 50 and guide rods 51 which are controlled for vertical movement in fixed vertical sleeves 52. The cylinders 50 reciprocate the vacuum platen between an upper position and a lower position. The platen is closely adjacent to the locator frame 35 and the glass sheets or sheet aligned within the locator frame in the lower position. Sufficient vacuum is applied to the vacuum platen in its lower position before the glass sheet or sheets come into contact with the platen so that the sheets are lifted with the vacuum platen when the latter is elevated. The shaping station discloses a flat vacuum platen that moves vertically downward to lift up a glass sheet arriving at the shaping station by vacuum, lifting it into an elevated position where the platen 40 is raised sufficiently to leave clearance to insert an outline shaping mold 60 between the gas hearth 25 and the glass sheet supported against the platen 40. Alternatively, the shaping station may include an upper shaped vacuum platen against which glass sheets are lifted on shaping members as depicted in U.S. Pat. No. 4,092,141 to Robert G. Frank et al or U.S. Pat. Nos. 3,846,104 and 3,846,106 to Samuel L. Seymour.

An outline mold preferably of the outline ring type, light in weight and provided with notches or serrations along its upper edge provides minimal interference with the flow of tempering medium during cooling. The outline mold 60 is carried on a shuttle 61, shown located at the unloading station 13 in FIG. 1. The shuttle carries the outline mold in a horizontal direction between the unloading station 13, the cooling station 12, and the shaping station 11. In the specific embodiment illustrated, the shuttle comprises a pair of cantilevered beams 62 supported at their downstream end by vertical braces 63, the upper ends of which are internally threaded and are adapted to be driven along a pair of horizontal guide rods 64. An electric motor drives a pair of threaded shafts 65 which engage internally threaded sleeves 66 carried at the upper ends of the vertical braces so as to positively drive the shuttle 61 and its supported outline mold 60 between the various stations according to a program of movement correlated with the shaping operation and the cooling operation. Cross braces 67 may be provided to reinforce the outline mold 60.

In the specific embodiment of the invention illustrated, when the vacuum platen 40 is lifted to a height above the elevation of the outline mold 60, the shuttle 61 is driven to the left as viewed in FIG. 1 so as to bring the outline mold into direct alignment beneath the sheet of glass supported on the vacuum platen 40. Typically, the distance between the vacuum platen and the hearth block at this point is usually about 6 to 8 inches (15 to 20 centimeters). This distance will have an effect on the rate at which the glass sheet loses heat, since a higher elevation raises the glass sheet to a cooler environment. The uppermost extent of the outline mold 60 when in a position of alignment directly beneath the glass sheet supported on the vacuum platen 40 is spaced from the glass sheet a distance greater than the minimum distance required to clear the glass sheet. Thus, when the glass sheet is released from the vacuum platen, it falls a distance and accelerates until it reaches the outline mold. This acceleration generates a substantial bending force on the glass sheet on impact with the outline mold. In a typical case where the contour of the shaping mold includes points of maximum elevation, the falling glass sheet first contacts these high points, and the bending moment is generated about these points. This bending moment forces the remainder of the glass sheet to bend downwardly until it substantially completely contacts the outline mold. Such a bending operation is termed "drop forming." It is appreciated that other methods of shaping glass sheets may be substituted for the drop forming method recited. For example, a shaping mold may be raised to impart its shape on the glass as it is lifted, as depicted in U.S. Pat. No. 3,476,540 to George F. Ritter et al, or the glass sheet may be lifted on a shaping mold into contact with an upper vacuum mold such as depicted in U.S. Pat. No. 4,092,141 to Robert G. Frank et al or as depicted in U.S. Pat. No. 3,846,104 to Samuel L. Seymour.

Regardless of how the glass sheet is supported for heating and shaping, it eventually arrives at a shaping station supported either on an extension of conveyor rolls as depicted in U.S. Pat. No. 3,476,540 to Ritter et al or U.S. Pat. No. 4,138,241 to Harold E. McKelvey, or on shaping molds of an outline type such as depicted in U.S. Pat. No. 3,846,104 to Seymour and U.S. Pat. No. 4,092,141 to Robert G. Frank et al. No matter how the glass is heated and supported during its shaping and conveyance into the cooling station, the gist of the present invention involves the further improvement in the cooling station which permits glass fragments not removed by sliding to be removed by gravity without sliding by providing apparatus constructed to permit the lower tempering nozzle housing to pivot beyond an oblique position in which glass fragments are slid from supporting position into a fragment clearance position where the glass fragments may drop without requiring sliding and the bottom nozzle housing may again be returned to its operating position for receiving the next glass sheet to be tempered.

In order to provide this clearance and this optimum amount of rotation, it is necessary to provide means to clear the upper nozzle housing as well. In the specific embodiment of the apparatus, an upper nozzle housing 70 is provided with upper nozzles 71 extending down from the apertured lower wall thereof and a lower nozzle housing 72 is provided with lower nozzles 73 extending upward from apertures in the upper wall thereof. The nozzle housings receive tempering medium under pressure. Flexible couplings such as an upper flexible coupling 75 connects the upper nozzle housing 70 to a source of air under pressure and a pair of flexible couplings 75 connects the lower nozzle housing 72 to a source of air under pressure.

The upper nozzles 71 and the lower nozzles 73 are arranged in their operating position with their extremities closest to a position occupied by a glass sheet therebetween in the cooling station 12. The length of each nozzle is so adjusted that the rows of nozzles conform generally to the transverse curvature of the glass sheets as depicted in FIGS. 2 and 4. The upper nozzle housing 70 has an upwardly extending chamber having a pair of lugs 76, each connected to a rod of a piston 77. Also, the outer wall of the chamber is provided with four vertical guide rods 78 which are received in sleeves 79 so as to control the vertical movement of the upper nozzle housing 70 in defined vertical paths. The sleeves 79 and the upper ends of pistons 77 are fixed to suitable support structure for the upper nozzle housing.

Each of the lower flexible couplings 75 terminates in a horizontal feed line 81 that has a radially inner adapter 82 at its inner end. The adapter 82 couples the horizontal feed line 81 to a short mating feed pipe 83 through a radially outer adapter 84 which cooperates with adapter 82 to form a rotatable coupling comprising adapters 82 and 84 and a bearing connection therebetween. A pinion gear 85 is fixed circumferentially around one of the adapters 84 and rests on a rack 86. The latter is slidably supported relative to a horizontal slide 87 by means of a horizontally acting piston 88 which is attached to an inner ear 89 of a pair of ears that are rigidly fixed to the rack 86 and slidably mounted for sliding movement relative to the horizontal slide 87. The rack 86, the horizontal slide 87 and the piston 88 are mounted on a platform 90. The latter is vertically adjustable in position through a vertical piston 91. The flexible couplings 75 permit the platform 90 to move vertically without interfering with the flow of tempering medium from the supply source to the lower nozzle housing 72. The platform 90 includes a pair of brackets 92 of a frame-like construction. Each of the brackets is provided with a series of wheel mounting brackets 93, each of which rotatably supports a wheel 94. The plurality of wheels 94 engage a circumferential track 95 around the periphery of the short feed pipes 83. Thus, the vertical piston 91 provides means for providing vertical adjustment for the platform 90 which supports the lower nozzle housing. In addition, movement of the horizontal piston 88 causes the rack 86 to be displaced thus causing the pinion gear 85 to rotate and cause the inner short feed pipe 83 on each side of the lower nozzle housing 72 to rotate therewith, the axis of rotation being confined by the freely rotating wheels 94 mounted on the wheel supporting brackets 93 of the frame-like brackets 92.

In order to assure structural rigidity for the rotatable coupling comprising adaptors 82 and 84 between the short feed pipe 83 and the horizontal feed line 81, a plurality of radially extending walls 96 rigidly connect the inner circular wall of the radially inner adapter 82 and the outer wall of a sleeve 97 of a thrust bearing 98. The latter comprises a tie rod 99 that is externally threaded at its ends and that extends through the sleeve 97, three bearings 100 and an additional sleeve 101 aligned axially with sleeve 97. A plurality of radially extending walls 102 interconnect the outer wall of additional sleeve 101 with the inner wall of the short feed pipe 83. Lock nuts 104 and 106 are secured to the opposite ends of the tie rod 99 to hold the sleeves 97 and 101 and the bearings 100 in axial compression while permitting sleeve 101 to pivot with its attached radially extending walls 102, the short feed pipe 83 and the lower nozzle housing 72 as a unit relative to the unitary structure provided by the sleeve 97, the attached radially extending walls 96, and the radially inner adapter 82 and its attached horizontal feed line 81. The radial walls 96 and 102 insure the structural rigidity of the rotatable coupling between the radially outer adapter 84 of the feed pipe 83 fixed to the lower nozzle housing 72 and the radially inner adapter 82 of the short feed pipe 81 fixed to the tempering medium delivery system, while the thrust bearing 98 cooperates with a rotatable bearing 108 between the radial outer adapter 84 and the radial inner adapter 82 to insure ease of pivoting therebetween.

Whenever breakage occurs during the cooling operation, an operator pushes a button which causes the upper elevator means 77 to lift the upper nozzle housing 70 and the vertical piston 91 to lower the platform 90 on which the lower nozzle housing 72 is mounted to separate the nozzle housings 70 and 72 from one another. When sufficient clearance is provided, the horizontal piston 88 is actuated to move the rack 86 horizontally to cause the pinion gear 85 to rotate the lower nozzle housing 72 from an operating position depicted in FIGS. 2 and 3 to a position of at least 90° rotation therefrom for clearance of fragments as depicted in FIGS. 1, 4 and 5. The rotation occurs away from the furnace exit so as to enable the particles to drop a distance from the furnace onto a fragment collecting bin below the tempering apparatus. The lower nozzle housing rotates to a point where any fragments that do not slide off when the lower nozzle housing 72 rotates through various oblique positions will drop by gravity into the collecting bin (not shown) below the cooling station without requiring sliding. The lower nozzle housing can then be rotated into its operative orientation and the elevator means 77 and the vertical piston 91 moved to cause the upper nozzle housing 70 and the lower nozzle housing 72 to move toward one another so that the upper nozzles 71 and the lower nozzles 73 are closely spaced with respect to each other to provide a relatively narrow path of transport of tempering medium toward the opposite surfaces of a succeeding glass sheet that will be supported therebetween. The dimensions of the outline mold 60 are such as to enable the mold and its supported glass sheet to move into the space between the upper nozzle 71 and the lower nozzle 73 without any difficulty.

The form of the invention shown and described in this specification represents an illustrative preferred embodiment of this invention. It is understood that various changes may be made in providing the ability for glass fragments to drop by gravity without requiring any sliding when the orientation of the lower nozzle housing 72 is rotated sufficiently without departing from the spirit of the invention as defined in the claimed subject matter that follows.

I claim:

1. In a method of tempering glass sheets wherein a hot glass sheet is supported between upper and lower nozzle housings which apply cold tempering medium toward the opposite major surfaces of said glass sheet at a rate sufficient to establish at least a partial temper in the glass sheet, whereby sometimes said sheet is fractured to form fragments during said cooling step and said lower nozzle housing is pivoted to remove at least some of said fragments by sliding, the improvement comprising pivoting said lower nozzle housing beyond an orientation that requires said fragments to be removed by sliding to an orientation wherein fragments that do not slide off the lower nozzle housing during said pivoting to said orientation are free to drop by gravity without sliding from said lower nozzle housing when said lower nozzle housing pivots beyond said orientation.

2. The improvement as in claim 1, further including simultaneously separating said upper nozzle housing from said lower nozzle housing a distance sufficient to provide clearance to pivot said lower nozzle housing to said orientation required to permit said fragments to fall by gravity without sliding.

3. The improvement as in claim 2, wherein said separating step comprises raising said upper nozzle housing.

4. The improvement as in claim 2 or claim 3, wherein said separating step includes lowering said lower nozzle housing.

5. Apparatus for tempering glass sheets comprising an upper nozzle housing having a lower apertured wall and a lower nozzle housing having an upper apertured wall, means for supporting said housings in operative positions relatively closely spaced to one another to define a narrow passage therebetween for receiving a glass sheet between said nozzle housings, means to supply cold tempering medium under pressure to said upper and lower nozzle housings for delivery through the apertures of said apertured walls toward the opposite major surfaces of said glass sheet, means for pivoting said lower nozzle housing into an orientation such that fragments that result from an occasional fracture of a said glass sheet that do not slide off said lower nozzle housing during said pivoting are free to drop by gravity at the end of said pivoting.

6. Apparatus as in claim 5, further including means to raise said upper nozzle housing in conjunction with the pivoting of said lower nozzle housing to provide clearance for pivoting said lower nozzle housing to said required orientation.

7. Apparatus as in claim 5 or claim 6, wherein said means to pivot said lower nozzle housing comprises a horizontally movable rack, a pinion gear fixed to a feed pipe communicating with said lower nozzle housing and fixed thereto, a horizontal feed line, means to supply tempering medium under pressure to said horizontal feed line, a rotatable coupling between said horizontal feed line and said feed pipe, and means to move said rack to cause said pinion gear to rotate and cause said feed pipe and said lower nozzle housing to rotate the latter about said rotatable coupling.

8. Apparatus as in claim 7, wherein said feed pipe has a circumferential track mounted for rolling movement relative to a plurality of rigidly supported freely rotatable wheels spaced circumferentially of one another.

9. Apparatus as in claim 7, wherein said means for pivoting said lower nozzle housing comprises a radially inner adapter fixed to said feed line, a radially outer adapter fixed to said feed pipe, a thrust bearing extending along an axis common to said adapters and comprising a tie rod, a pair of sleeves rotatably supported in axially aligned relation to one another for rotation about said tie rods, radially extending walls connecting the outer wall of one of said sleeves to the inner wall of one of said adapters and additional radially extending walls connecting the outer wall of the other of said sleeves to the inner wall of the other of said adapters, said adapters being concentric to one another with a bearing relation therebetween.

* * * * *